US006243666B1

(12) United States Patent
Boone et al.

(10) Patent No.: US 6,243,666 B1
(45) Date of Patent: Jun. 5, 2001

(54) MAINTENANCE SYSTEM AND INTERFACE FOR USE IN A MODULARIZED, HIGH-SPEED DATA PROCESSING SYSTEM

(75) Inventors: Lewis Allen Boone, Fridley; Donald Eugene Schroeder, White Bear Lake; Thomas E. Wulling, St. Paul, all of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/097,116

(22) Filed: Jun. 12, 1998

(51) Int. Cl.[7] ....................................... G06F 11/00

(52) U.S. Cl. ................... 703/20; 703/25; 714/5; 716/4

(58) Field of Search ................... 703/1, 16, 20, 703/25; 716/4, 7; 714/2, 5

(56) References Cited

U.S. PATENT DOCUMENTS

| | | | |
|---|---|---|---|
| 4,549,296 | * 10/1985 | Castel et al. | 371/16 |
| 4,996,688 | 2/1991 | Byers et al. | 371/16.5 |
| 5,040,108 | 8/1991 | Kanazawa | 364/200 |
| 5,289,372 | * 2/1994 | Guthrie et al. | 364/403 |
| 5,423,026 | * 6/1995 | Cook et al. | 395/575 |
| 5,495,573 | * 2/1996 | Datwyler et al. | 395/185.01 |
| 5,581,482 | 12/1996 | Wiedenman et al. | 364/551.01 |
| 5,809,533 | * 9/1998 | Tran et al. | 711/141 |
| 5,815,649 | * 9/1998 | Utter et al. | 395/112.04 |
| 5,826,060 | * 10/1998 | Santoline et al. | 395/500 |
| 6,012,148 | * 1/2000 | Leberge et al. | 714/2 |
| 6,052,708 | * 4/2000 | Flynn et al. | 709/108 |

* cited by examiner

Primary Examiner—Kevin J. Teska
Assistant Examiner—Thai Phan
(74) Attorney, Agent, or Firm—Beth L. McMahon; Michael B. Atlass; Charles A. Johnson

(57) ABSTRACT

An improved maintenance system and interface for use in a large-scale data processing system is provided. Within the data processing system, logic is partitioned into multiple logical groups. Each of the groups is associated with a bi-directional port, and each group may be intercoupled to other groups via the associated port. Within each of the groups, an internal condition detection circuit selectively monitors selected logic circuits to detect the presence of certain predetermined conditions or events. When an internal condition is detected, a notification is provided to the bi-directional port and broadcast over the interface to all other logic groups simultaneously. Each logic group further includes an external condition detection circuit interconnected to the respective bi-directional port whereby condition indicators are received from other logic groups as an external condition indicator. Within each logic group, the respective internal indicator and a received external condition indicator are provided to a control unit within the group. The control unit generates control signals which are provided to selected ones of the monitored circuits within the group to perform a predetermined function such as stopping the clock. The configuration allows actions to be taken selectively throughout the system substantially simultaneously and with minimal delay following the condition necessitating the action. Because only a single bi-directional port is needed to interconnect the various logic groups, pin usage is significantly reduced when each group is implemented within a different respective physical device.

31 Claims, 5 Drawing Sheets

*Control Unit*

MAINTENANCE SYSTEM AND INTERFACE FOR USE IN A MODULARIZED, HIGH-SPEED DATA PROCESSING SYSTEM

BACKGROUND OF THE INVENTION

1. Field of the Invention

This invention relates generally to a maintenance system and interface for use in a high-speed data processing system; and, more specifically, relates to a maintenance system for use in a modularized data processing system wherein maintenance operations must be completed in real time in each of the logical modules of the system substantially simultaneously and with minimum delay, and wherein the interface is implemented using a minimum number of pin resources.

2. Description of the Prior Art

As today's data processing systems increase in complexity, an ever-increasing number of maintenance functions are being added to provide debug, run-time analysis, and clock control capabilities. These functions are primarily used to accomplish debug and system analysis operations, but may also be used to accomplish system tasks such as clock synchronization. For example, trace capabilities may be added to the logic so that after the occurrence of an error, system analysis may be performed to determine the source of the error. These trace capabilities generally involve the addition of storage devices such as history stacks to a logic design. The history stacks capture the logic levels of critical ones of the signals at predetermined time intervals to create a trace of the events leading up to the error. The co-pending application entitled "Programmable Error Detect/Mask Utilizing Bus History Stack", Ser. No. 08/790,629 filed Jan. 29, 1997, and which is assigned to the assignee of the current invention, describes the use of history stacks in more detail.

Another example of maintenance functionality that may be added to aid in debug efforts includes clock control circuitry. This circuitry may be used to stop the clocks in one or more units of a data processing system following the occurrence of a predetermined error. This "slam-stop" capability allows the state of the system to be preserved and later analyzed so that the source of the error can be discovered. Similarly, it may be desirable to stop the clock in one or more units just prior to the occurrence of a known, re-creatable error. Single clock pulses may be provided to the logic so that the state of the logic prior to, and during the error, may be analyzed.

Some maintenance functions are used during normal system operations. For example, performance monitoring logic may be added to a system to capture data indicative of system throughput and loading. This type of logic might include counter circuits which record the number of requests made to particular units within a system. The captured performance data allows system analysts to determine how to obtain maximum efficiency from the system.

Another type of maintenance function required within the system involves clock synchronization. Often, more than one of the units within a system have a dayclock counter used to provide timestamp and scheduling information to the operating system or other application programs. These dayclock counters must be incremented in a synchronized manner. Logic is needed in the system to perform this synchronized clock operation.

The type of maintenance functions discussed above generally requires that one or more actions be taken within selected units of the system substantially simultaneously. For example, to provide data which accurately reflects system usage characteristics, the performance monitoring logic circuits within all units of a system should be enabled and disabled at the same time. Similarly, clock control operations must be performed in unison throughout the various units of a system. Likewise, history stack operations must be enabled or disabled throughout the system at approximately the same time so an accurate snapshot of system operations can be obtained. Moreover, it is important that various ones of the debug functions such as clock slam-stop operations be performed relatively quickly after an error occurs so that the state of the system at the time of the error is preserved.

Many prior art data processing systems provide dedicated logic for each of the maintenance functions included in the system. That is, individual logic is provided for controlling clock advance operations, different logic is provided for initiating slam-stop operations, and so on. Since dedicated logic interconnections are provided between the various units of the system for each maintenance function, the systems are logic intensive and utilize a large number of interconnecting pins. U.S. Pat. No. 5,040,108 to Kanazawa describes a system for stopping clock operations to predetermined error-collection registers within a processing unit following the occurrence of errors. Dedicated point-to-point lines communicate the occurrence of errors within one of the processing units to a central control processor. The control processor responds by issuing an instruction to the failing unit on dedicated interface lines, and the failing processing unit thereafter asserts a signal to stop the clocking of the error-collection registers. This system has the disadvantage of requiring separate error notification and response lines for each unit. In designs in which pin limitations are a consideration, the dedication of this number of pins to a single maintenance function is undesirable. Moreover, the use of an intervening control processor is undesirable in today's high-speed systems because the added delay required for the control processor to respond does not allow for substantially immediate action following the occurrence of an event. This may result in the loss of the state of the machine at the time the error occurred.

Another maintenance system and interface is disclosed in U.S. Pat. No. 5,581,482 to Wiedenman et al. assigned to the assignee of the current invention. The disclosed system describes dedicated hardware and interconnections which intercouple the various units of a data processor to accomplish performance monitoring and clock control functions. Because the maintenance functions are performed on separate dedicated interfaces, the system is not suitable for designs that are severely pin-limited.

One method of reducing the number of pin resources utilized within a maintenance system is to combine various logic event occurrences using a hierarchical logic tree structure so that fewer interconnecting nets are needed to transfer the event notifications to other units. U.S. Pat. No. 4,996,688 to Byers et al., which is assigned to the assignee of the current invention, discloses this type of a hierarchical structure. Multiple ranks of state devices are used to capture and combine logical events into an interrupt signal which is provided to a programmed micro-controller. Although this system is useful in consolidating the events so that fewer interconnecting resources are utilized, the multiple register ranks insert delay into the notification process.

What is needed is a general-purpose maintenance system and interface that utilizes a minimum number of pin resources, and whereby pre-selected ones of the units within a data processing system can be monitored for the occurrence of certain logical events. Upon the occurrence of one of the monitored events, a notification is provided substantially simultaneously to all units in the system so that a selected action or actions may be taken within selected ones of the units with minimal delay.

OBJECTS

The primary object of the invention is to provide an improved maintenance system and interface for a data processing system;

A further object of the invention is to provide a maintenance interface that is multi-purpose and may be used for a variety of maintenance operations;

A yet further object of the invention is to provide a maintenance interface that requires a minimum number of pin resources to implement;

A still further object of the invention is to provide a maintenance system and interface wherein the ones of the events to be monitored are selectably determined;

Another object of the invention is to provide a maintenance system and interface which allows groups of logic within a data processing system to be selectively enabled to receive notification of an event occurrence within the data processing system;

A yet further object of the invention is to provide a maintenance system and interface coupled to detect predetermined events, the occurrence of which results in the initiation of programmable clock control operations;

A still further object of the invention is to provide a maintenance system and interface for a multi-unit system capable of performing selectable operations in selectable units of the system substantially simultaneously; and A further object of the invention is to provide a maintenance system and interface which can be utilized to interconnect groups of logic using multiple, interconnected maintenance interfaces capable of transmitting event occurrences to all units within a large data processing system.

These and other more detailed and specific objectives of the invention will become apparent from the following description of the invention.

SUMMARY OF THE INVENTION

The objectives of the present invention are achieved in an improved maintenance system and interface for use in a large-scale data processing system. Within the data processing system, logic is segmented in multiple logic groups. Within each of the groups, selected logic circuits are monitored to detect the presence of certain predetermined conditions or events which may include service request indicators, fault indicators, timer expiration indicators, and the like. The occurrence of such events results in the assertion of an internal condition indicator, which is detected by an internal condition detection circuit.

Each of the internal condition detection circuits is coupled to a respective bi-directional port. According to one embodiment of the invention, all bi-directional ports of all logic groups are interconnected via a single interface such that the detection of an internal condition by any of the internal condition detection circuits may be broadcast over the interface to all other logic groups simultaneously. Each logic group further includes an external condition detection circuit interconnected to the respective bi-directional port to receive as an external condition indicator the indicators broadcast from other logic groups. The external condition detection circuit includes a synchronization circuit which may be used to synchronize the external condition to the internal clock signal of the respective logic group.

A control unit within each of the logic groups receives the respective external and internal condition indicators and generates control signals which are provided to selected ones of the monitored circuits within the respective group. Each of the control signals performs a predetermined function which may include stopping the clock The control unit is programmed to selectively determine which conditions are to be monitored, and which control signals are to be provided in response to a detected condition.

Because of the coupling of the groups via a single interface, all groups in the system receive notification of any event within the system at substantially the same time. Moreover, in the preferred embodiment, the internal condition detection circuit may, but need not, store a detected condition. That is, it is possible to eliminate all ranks of state devices existing between any monitored condition within the system and any control unit so that control signals may be provided to the monitored circuits anywhere in the system prior to the clock edge following the generation of the detected condition. This allows clocks to be disabled before the state of the system changes following an error.

The invention also conserves important pin resources. Since generally, a single logic group will be implemented within a different respective physical device such as an Application Specific Integrated Circuit (ASIC), the invention provides a means whereby only a single pin per device must be dedicated to the intercoupling interface for conveying to all physical devices the occurrence of a specific condition existing within one of the devices. This is a significant savings over prior art maintenance interfaces.

According to another embodiment of the invention, a single logic group may include multiple bi-directional ports, each connected to a respective interface for receiving external condition indicators from other logic groups. Each of the multiple bi-directional ports are coupled to a cross-coupling circuit so that an external condition indicator received from one port is rippled forward to all other ports. This embodiment can be used to interconnect a large number of logic groups in a daisy-chain, or alternatively, a hub-and-spoke configuration. Such configurations are useful for large systems wherein the number of logic groups being monitored exceed the maximum number of groups which may be interconnected on a single interface as dictated by drive considerations.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE PREFERRED EMBODIMENTS

Figure 1:
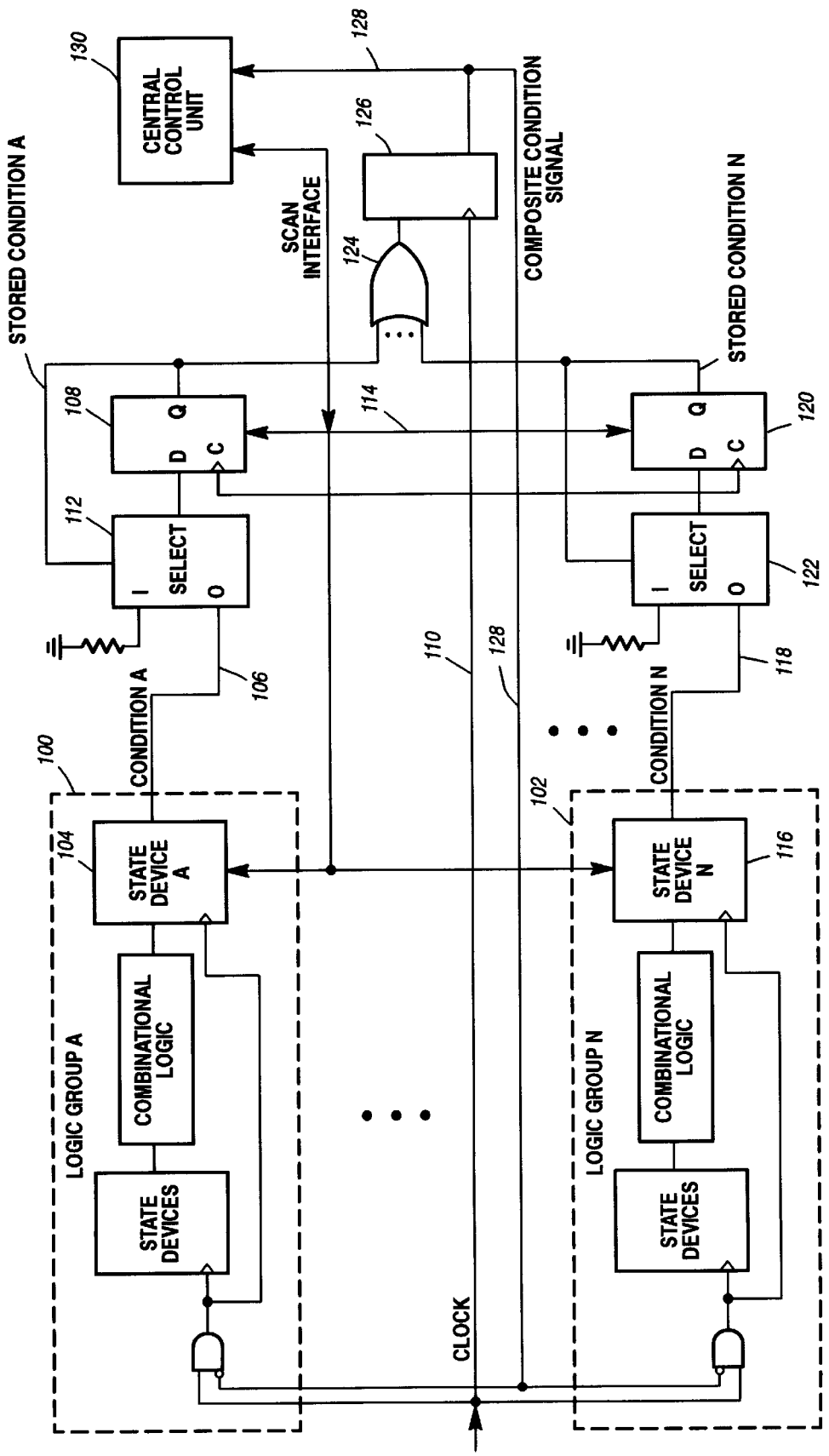
FIG. 1 is a block diagram of a prior art maintenance system and interface.

FIG. 1 is a block diagram of a prior art maintenance system and interface. The system of FIG. 1 includes multiple logic groups shown for exemplary purposes as Logic Group A 100 and Logic Group N 102. Any multiple number of logic groups can be included within the system. Each logic group includes combinational logic and state devices. Predetermined ones of the state devices within each logic group are monitored for a particular state. In FIG. 1, State Device A 104 is monitored for the occurrence of Condition A on Line 106. The assertion of Condition A on Line 106 causes the monitoring State Device 108 to be set upon the occurrence of the active edge of the Clock on Line 110. Once State Device 108 is set, Selector 112 prevents State Device A from clearing until it is cleared by Scan Interface on Line 114, as is discussed further below. In a similar manner, State Device N 116 is monitored for the occurrence of Condition N on Line 118. The assertion of Condition N causes monitoring State Device 120 to be set, and Selector 122 retains the state of State Device 120 until the state is cleared by Scan Interface 114.

The setting of any of the monitoring state devices such as State Device 108 indicates that some event has occurred. This event could be an error, a service request, or the expiration of a system timer. The event occurrence is detected by OR circuit 124, and the subsequent setting of State Device 126, which results in the assertion of the Composite Condition Signal on Line 128.

The assertion of the Composite Condition Signal on Line 128 causes some action to occur within the system. This action could be the disabling of the clocks to all logic, the disabling of selected trace logic, or the disabling of a performance monitoring function. In FIG. 1, the setting of the Composite Condition Signal 128 disables the further clocking of the various logic groups, and signals the Central Control Unit 130 of the event occurrence. Central Control Unit 130 is able to read, and to subsequently reset, the state of the state devices via Scan Interface 114. Scan Interface 114 is capable of reading and writing serially interconnected ones of the logic state devices using scan-shift operations in a manner known in the art. A scan interface of the type shown in FIG. 1 is described in U.S. Pat. No. 4,996,688 to Byers et al. which is assigned to the assignee of the current invention.

Often maintenance systems of the type shown in FIG. 1 are distributed throughout multiple physical devices in a system. These physical devices may include Application Specific Integrated Circuits (ASICs) or other types of customizable logic devices. The various physical devices must be interconnected so that communication may occur throughout the maintenance system. Interconnecting physical devices to form a single coherent maintenance system poses problems related to both pin-resource allocation, and to the imposed latency in notification after the occurrence of a monitored event.

Figure 2:
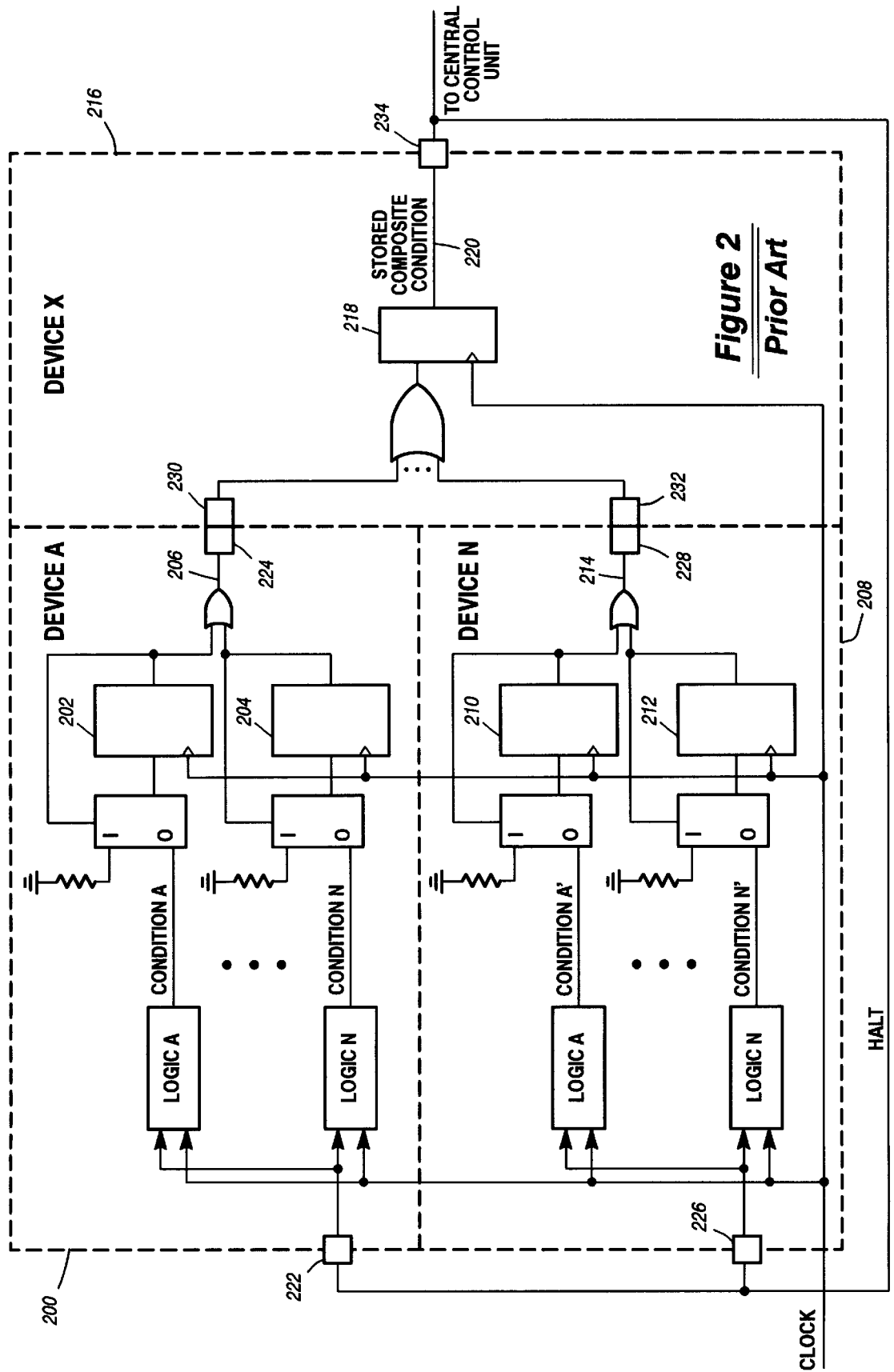
FIG. 2 is a block diagram of a prior art maintenance system which is implemented sing multiple physical devices.

FIG. 2 is a block diagram of a prior art maintenance system which is implemented using multiple physical devices such as ASICs. Within Device A 200 (shown dashed), State Devices 202 and 204 are shown monitoring for conditions A and N, respectively, although any number of state devices could be included within Device A. The monitored conditions are combined and provided collectively on Line 206. Similarly, within Device N 208 (shown dashed), State Devices 210 and 212 are shown monitoring for conditions A' and N', respectively, and the monitored conditions are combined and provided collectively on Line 214. The monitored circuits could be included within any number of logic devices.

It may be remembered that the maintenance system is structured to detect the occurrence of one or more events within any device so that an action may be initiated within any or all of the devices. Therefore, logic must be provided to combine the event signals from all devices into a composite signal that may be utilized to initiate the action, and to signal the Control Unit of the event occurrence. In the maintenance system of FIG. 2, logic within Device X 216 (shown dashed) is provided to combine the event signals. The Stored Composite Condition is stored in State Device 218, and is provided on Line 220 to both the Central Control Unit and to each of the other devices. The Stored Composite Condition may be utilized within the devices to prevent further clocking of selected logic, or may be utilized to accomplish a different maintenance operation, as is described below.

The system of FIG. 2 exhibits the problems associated with distributing a maintenance system and interface over multiple devices. Two ranks of state devices are necessary to obtain the Stored Composite Condition, the first being the rank of state devices interfacing with the monitored signals, for example State Device 202, and the second being that shown as State Device 218. In particular, it may be noted that the first rank of state devices may not be eliminated since the monitored logic continues receiving clock pulses until a halt signal is provided. Thus, the condition indication signals provided by the various logic circuits are transient, and an indication of event occurrence must be stored within the first rank of registers. As a result, at least two clock cycles occur between the generation of a monitored condition and the generation of the Stored Composite Condition on Line 220. Therefore, the actual state of the machine may be lost by the time the Stored Composite Condition is available to selectively prevent further clocking of the system.

Another problem associated with the circuit of FIG. 2 involves the use of pin resources. Often, especially in large-scale designs implemented in high-density ASIC devices, the number of pins available for use on the ASIC govern the amount of logic which may actually be placed within the device. Therefore, pin conservation is a primary concern when designing and placing logical functions within a device. In the circuit of FIG. 2, the maintenance system (not including the Scan Interface, which is not shown in FIG. 2) requires at least two pin resources to implement in each of Devices A 200 and N 208. These are shown as Pins 222, 224, 226, and 228, respectively. On Device X, a pin must be dedicated for each of the other interfacing devices shown as Devices A and N, and another pin must be dedicated to providing the Stored Composite Condition, shown on Line 220. These pins are shown as Pins 230, 232, and 234, respectively. Many more pins are required in larger designs having substantially more devices. In systems in which pins resources are severely limited, this implementation is not acceptable.

Figure 3:
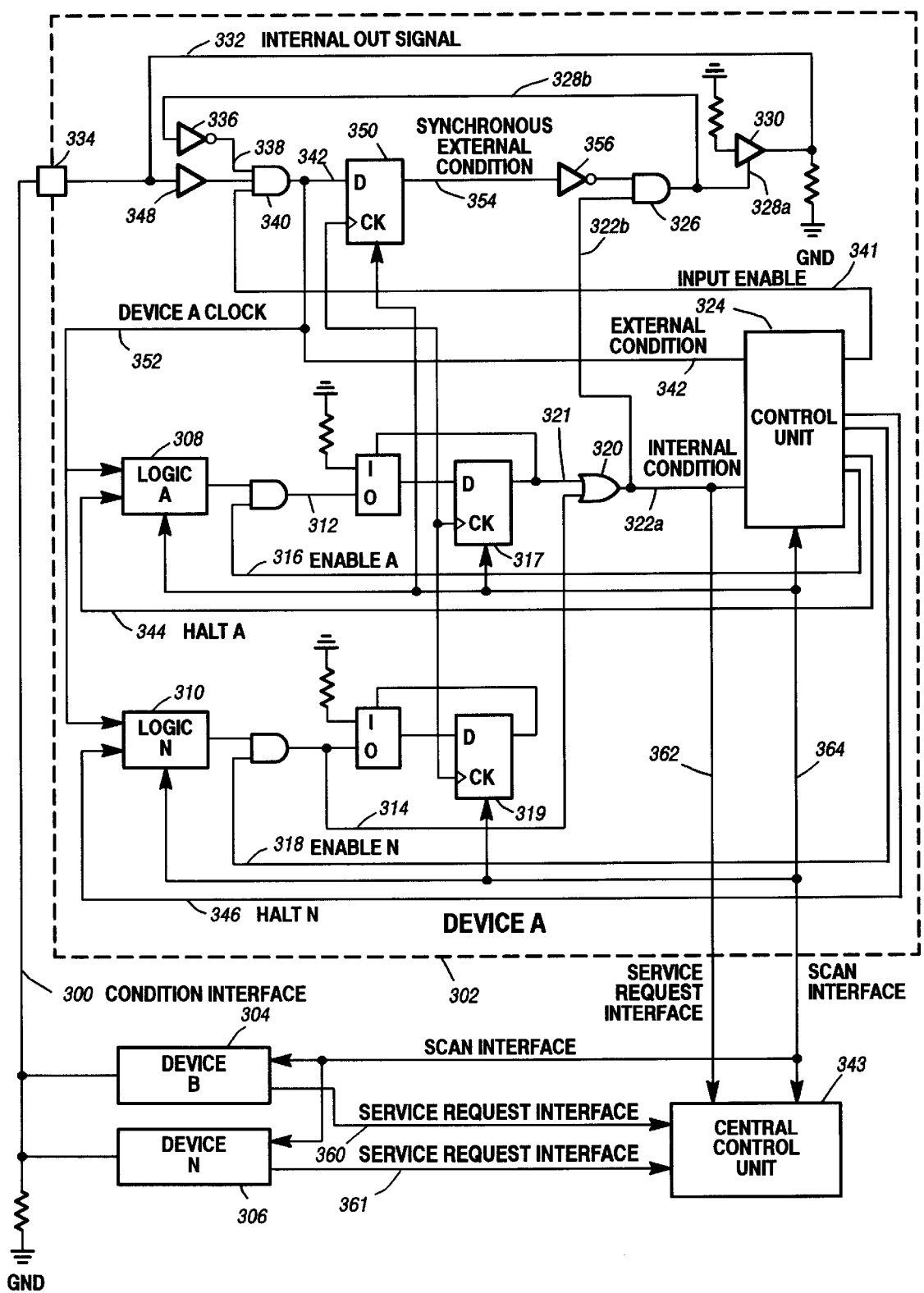
FIG. 3 is a block diagram of the maintenance system and interface of the current invention.

FIG. 3 is a block diagram of the maintenance system and interface of the current invention. This maintenance system and interface solves the above-discussed problems by providing a system in which each device utilizes a common signal line shown as Condition Interface on Line 300 to notify any of the other devices of an event occurrence. This reduces the number of pins used to implement the event-notification interface to one pin per device. Furthermore, the delay associated with the detection and subsequent notification of an event within the current system is reduced.

In the system of FIG. 3, Device A 302, Device B, 304, and Device N, 306 are shown interconnected via the Condition Interface on Line 300, which is tied to ground through a resistor. Up to a predetermined maximum number of devices may be interconnected via Line 300 as determined by the maximum drive capability of the interfacing driver circuits.

FIG. 3 shows the detailed logic of Device A 302, although it is understood that similar logic exists within each of the other logic devices such as Device B 304 and Device N 306. Within Device A, various logic circuits or groups, shown as Logic A 308 and Logic N 310, are monitored for predetermined events or conditions on Lines 312 and 314, respectively. It is understood that many more logic circuits may be monitored than are shown in FIG. 3. An event will be detected on Lines 312 and 314 if a respective one of the enable signals, shown as Enable A 316 and Enable N 318, respectively, is active. The use of the programmable enable signals will be discussed further below.

When one of the monitored conditions occurs, a respective one of the monitoring state devices, shown as State Devices 317 and 319, captures the condition. A signal indicative of the monitored event occurrence is also provided to OR circuit 320. Depending on various design considerations, the signal provided to OR circuit 320 may be provided either by one of the monitoring state devices as is shown by Line 321, or alternatively may be a signal driven directly by the monitored circuit, as is shown by Line 314. Thus, State Devices 317 and 319, and OR circuit 320 comprise an internal condition detector circuit for detecting the occurrence of one of the monitored conditions.

OR circuit 320 provides the collective Internal Condition Indicator on Line 322a to the Control Unit 324, and on Line 322b to AND circuit 326. AND circuit 326 drives a high-active signal on Line 328a to enable Driver 330. The input to Driver 330 is tied high, and Driver 330 therefore drives the high-active Internal Out Signal on Line 332 to Pin 334, and thereafter onto Line 300 to Device B and Device N.

When AND circuit 326 provides a high-active signal, the signal is also provided on Line 328b to Inverter 336 to force the signal on Line 338 low. The signal on Line 338 is driven to AND circuit 340 to thereafter prevent the assertion of the External Condition Signal on Line 342. Thus, if the Internal Condition Signal on Lines 322a and 322b is asserted, the External Condition Signal may not thereafter also be asserted.

The Internal Condition Signal is provided on Line 322a to Control Unit 324. The Control Unit contains programmable logic which is used to selectively determine which conditions will be detected, and how the detected conditions will be handler. Control Unit 324 includes programmable logic to generate enable signals, shown as Enable A 316 and Enable N 318 to selectively allow ones of the logic circuits to be monitored. This will be discussed further below. Control Unit 324 further includes programmable logic to selectively allow actions to be taken in response to the assertion of the Internal Condition Signal on Line 322a or the assertion of the External Condition Signal on Line 342. Based on this programmed logic, action signals shown as Halt A and Halt N on Lines 344 and 346, respectively, are provided to selected ones of the logic circuits. These action signals may be used to prevent further clocking of a respective one of the logic circuits in a manner similar to that shown in FIG. 1. Alternatively, these signals may be used to initiate other maintenance functions as is described below.

The maintenance circuit shown within Device A 302 is also used to detect the occurrence of an event detected within one of the other devices shown as Device B 304 or Device N 306. When one of these other devices detects the occurrence of an internal condition, this occurrence is driven onto Line 300 in the manner discussed above with respect to Device A. This signal is provided to Input Driver 348 of Device A, which in turn, provides the signal to AND circuit 340. If Driver 330 is not enabled, the Internal Out Signal on Line 332 is not driven by Driver 330. Therefore, assuming the Input Enable Signal on Line 341 is provided by Control Unit 324, AND circuit 340 drives the External Condition Signal on Line 342 high active. If, however, Driver 330 is enabled by the detection of a previous internal condition, the generation of the External Condition Signal is blocked by the assertion of a low-active signal on Line 338.

For the case in which the External Condition Signal is received before an internal condition is detected, the External Condition Signal is provided on Line 342 to State Device 350, which latches the condition. Although the various devices within a system may share a clock signal, this need not be the case. Therefore, State Device 350 may be necessary to synchronize the External Condition Signal to the internal Device A clock signal which is shown in FIG. 3 as Device A Clock Signal on Line 352. State Device 350 also serves as an anti-feedback latch to prevent latchup of the combinational circuit including the feedback path on Line 328b.

After State Device 350 has captured the External Condition Signal, it provides Synchronous External Condition Signal on line 354 to Inverter 356, which in turn provides a signal to AND circuit 326, blocking the assertion of a high-active signal on Line 328b. Thus, once State Device 350 stores the Synchronous External Condition, Driver 330 will not be enabled to also drive Line 300. If necessary for synchronization purposes, the Synchronous External Condition on Line 354 may be provided to the Control Unit 324 instead of the External Condition Signal on Line 342.

In addition to being provided to Control Unit 324, the Internal Condition Signal is also provided from Device A to the Central Control Unit 343 on Service Request Interface 362. Similar Service Request Interfaces may be provided for Devices B and N, as are shown by Lines 360 and 361, respectively. Once the Central Control Unit 343 is notified of the occurrence of the condition, the Central Control Unit may selectively scan read the states stored within the various logic circuits of the system using the Scan Interface shown on Line 364. After the system state has been preserved for later analysis within the Central Control Unit 343, the state devices within the monitored logic circuits, as well as the monitoring state devices, may be cleared and/or set to an operational state by the Central Control Unit so that clocking of the device may be resumed and normal system operations may be continued.

According to an alternative embodiment, the Internal Condition Signal and the External Condition Signal may be provided to Central Control Unit 343 from just a single Device to further conserve pins. The Central Control Unit may then have to pin-point the source of a signaled occurrence using Scan Set Interface on Line 364.

The circuit of FIG. 3 solves the above-discussed problems associated with prior art maintenance systems. Each device requires only a single dedicated pin for use with the Condition Interface. For example, Device A 302 is interconnected to Line 300 via Pin 334. Moreover, the time required to notify all devices of an event occurrence is reduced by at least one, and possibly two, clock cycles. If unlatched monitored conditions such as that shown on Line 314 of FIG. 3 are utilized to generate the Internal Out Signal on Line 332, event notification may be provided on Line 300 in just slightly longer than the time required to provide the Internal Condition Signal on Line 322a to Control Unit 324. Depending on interface propagation delay times and clock speeds, halt signals may be provided to the respective logic circuits before the following clock edge, thereby preserving the state of the machine at the time of event occurrence. This will be described further below in conjunction with a description of Control Unit 324 operation. The invention therefore provides a significant improvement over prior art systems, which generally require at least two clock edges following event occurrence to provide notification to all circuits as is discussed above. This results in the loss of the state of the machine.

Figure 4:
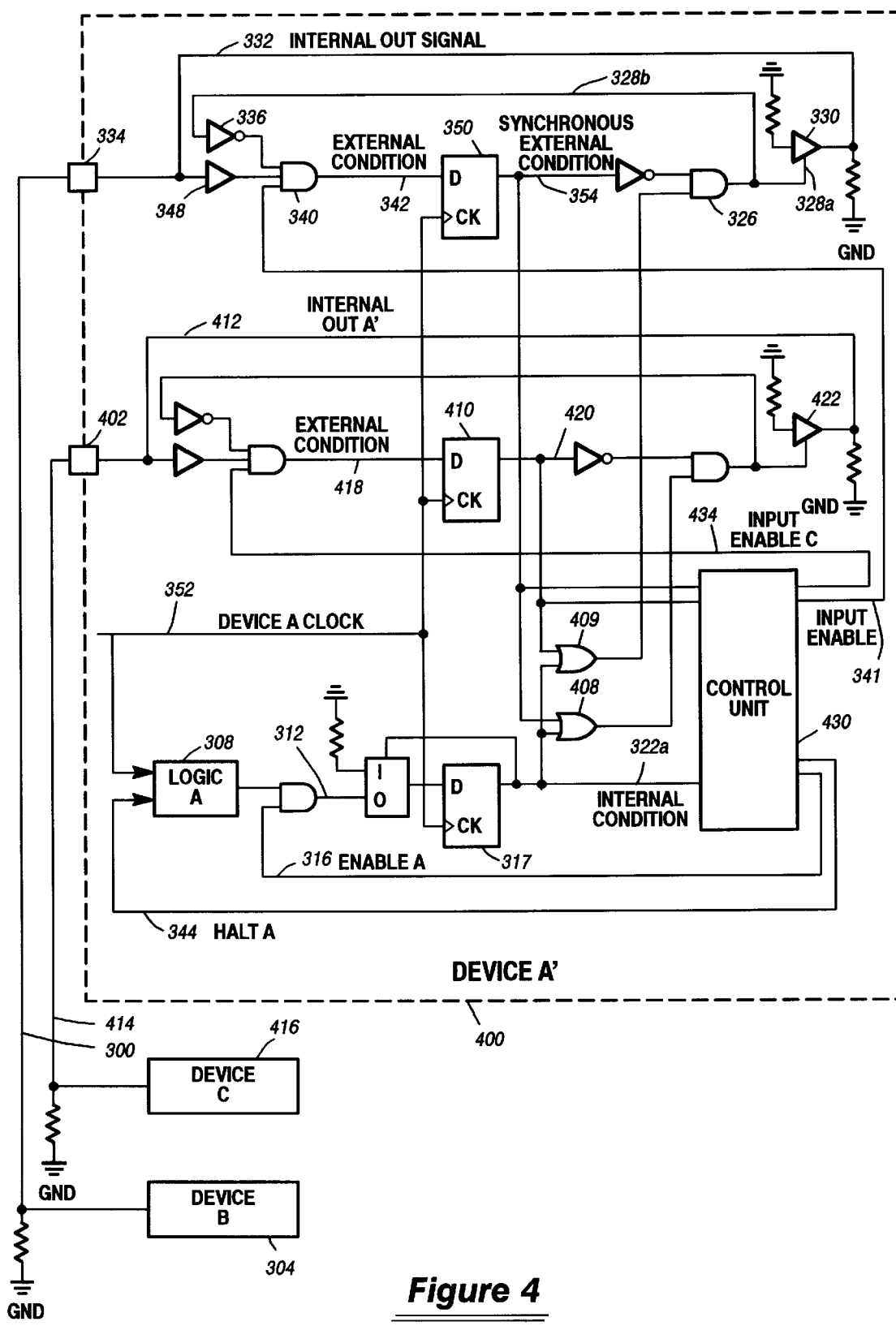
FIG. 4 is a block diagram of the maintenance system wherein multiple bi-directional parts are provided within a single logic device.

FIG. 4 is a block diagram of the maintenance system wherein multiple bi-directional ports are provided within a single logic device. This figure shows Device A' 400, which includes the circuit of FIG. 3, and further includes an additional bi-directional port shown as Pin 402 used to create an expanded configuration. For simplicity, FIG. 4 omits the Central Control Unit 343, the Service Request Interfaces on Lines 360, 361, and 362, and the Scan Interface 364, although it is understood that these elements are interconnected in a manner similar to that shown in FIG. 3.

In the circuit of FIG. 4, Device A' 400 is coupled to Device B 304 via Condition Interface on Line 300, and the bi-directional port on Pin 334. Device A' 400 is further coupled to Device C 416 via Condition Interface on Line 414, and Pin 402. Additional devices may be coupled to either, or both, of these Condition Interfaces on Lines 300 and 414.

An occurrence of a condition within Logic A 308 results in State Device 317 providing an active high signal to OR circuit 408. If a Synchronous External Condition C has not been stored within State Device 410, the Internal Out A' Signal on Line 412 is provided to Pin 402 and driven via Line 414 to Device C 416. Otherwise, if the External Condition C 418 is stored by State Device 410 and provided as Synchronous External Condition C on Line 420, Driver 422 remains in the high impedance state. It is understood that one or more other logic circuits such as Logic A 308 could be monitored by OR circuit 408, and could initiate the generation of Internal Out A' Signal.

Logic A 308 also provides an active high signal to OR circuit 409. If an External Condition on Line 342 has not been stored within State Device 350, the Internal Out Signal on Line 332 is provided to Pin 334 and driven via Line 300 to Device B 304. Otherwise, if the External Condition is stored by State Device 350 and provided as Synchronous External Condition on Line 354, Driver 330 remains in the high impedance state.

The circuit associated with Pin 334 is cross-coupled to the circuit associated with Pin 402. That is, the Synchronous External Condition on Line 354 is provided to OR circuit 408, and Synchronous External Condition C on Line 420 is provided to OR circuit 409. This allows the Synchronous External Condition 354 received from Device B 304 to be rippled forward to the Internal Out A' Signal on Line 412 to Device C 416. Likewise, the Synchronous External Condition C on Line 420 received from Device C 416 may be rippled forward to the Internal Out Signal on Line 332 and provided to Device B 304. If no synchronization of external conditions is required, the asynchronous external conditions from the interface may be cross-coupled. For example, External Condition Signal on Line 342, may be provided instead of Synchronous External Condition to OR circuit 408. This allows a signal to be propagated from Line 300 to Line 414 more quickly.

In this configuration, both Synchronous External Condition Signals shown on Lines 354 and 420, along with the latched Internal Condition Signal on Line 322a, may be provided to Control Unit 430. Alternatively, the unlatched version of these signals, shown on Lines 342, 418, and 312, respectively, may be supplied to the Control Unit if synchronization is not required. It will be understood that additional logic circuits other than Logic A could be monitored for a condition occurrence. In that instance, all detected conditions may be provided to an additional OR circuit which generates the Internal Condition 322a. The Internal Condition 322a may then be provided by the additional OR circuit to Control Unit 430, and to OR circuits 408 and 409.

Control Unit 430 provides two enables, shown as Input Enable 341 and Input Enable C 434 to enable reception of signals on Lines 300 and 414, respectively. The enables allow for partitioning of the data processing system such that groups of devices may be formed, and event notification is propagated only among the devices located within the same group. The enables also allow a way to disable an interface that is not being used because of the omission of predetermined devices within the system as could occur, for example, in smaller system configurations.

As discussed above, in addition to Logic A 308, other logic circuits could be monitored for a condition occurrence within the circuit shown in FIG. 4. In these instances, the Control Unit 430 provides additional enable and halt signals for each of the monitored circuits in a manner similar to that shown in FIG. 3.

The configuration of FIG. 4 has several advantages over that shown in FIG. 3. In a large system, connecting all devices to a single bi-directional line may not be possible because of drive limitations. Therefore, the circuits that are to be monitored as a group and notified simultaneously of an event occurrence may be coupled to the same Condition Interface, while other devices so grouped are coupled to a different Condition Interface. Although those circuits not coupled to the same Condition Interface may not be notified on the same clock cycle as those coupled to a different Condition Interface, this may not be critical in all instances.

Other variations of the circuit of FIG. 4 are possible. If all devices are of the type shown as Device A' 400 having two bi-directional ports, and synchronized event notification is not an issue, the devices may be interconnected in a daisy-chain fashion. Alternatively, a hub-and-spoke configuration could be created in which a device having any number of bi-directional ports is utilized as a central hub of the system, with multiple Condition Interfaces radiating from that hub. Other variations are also possible.

Figure 5:
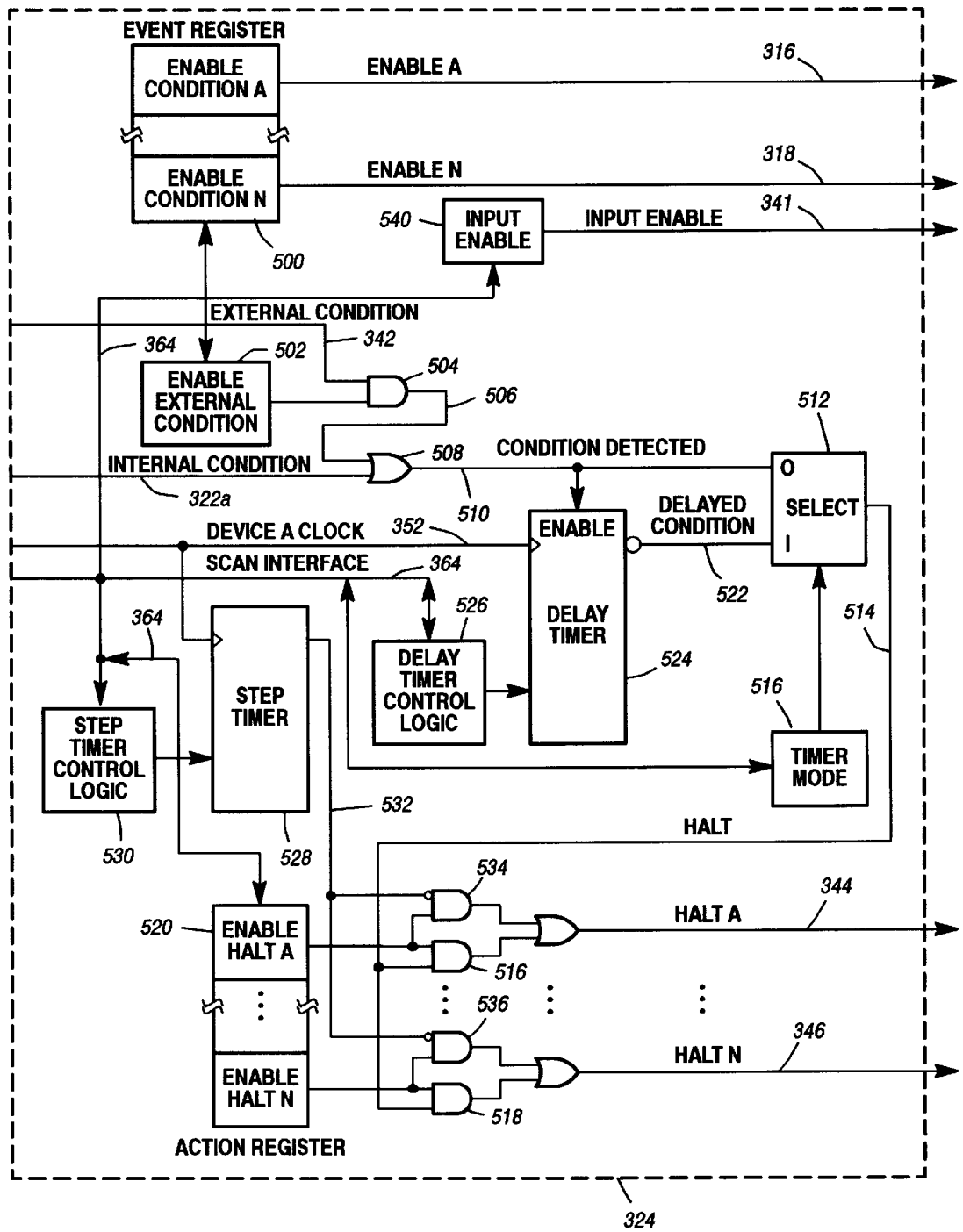
FIG. 5 is a block diagram of the control unit.

FIG. 5 is a block diagram of the Control Unit 324. Programmable storage devices are provided within the Control Unit to select both the conditions which are to be monitored and the actions which are to be taken should one of the selected conditions, or events, occur. These programmable storage devices may be set and cleared using Scan Interface 364 discussed above. Event Register 500 is provided to programmably select which conditions are to be monitored. This register drives Enable A 316, Enable N 318, and so on. These enable signals are provided to qualify which logic circuits will be monitored by the maintenance system as shown in FIGS. 3 and 4.

A programmable Enable External Condition state device 502 is provided to enable or disable reception of the External Condition Signal 342 via AND circuit 504. If AND circuit 504 is enabled, the Qualified External Condition Signal is provided by the AND circuit 504 on Line 506 to OR circuit 508 which also receives Internal Condition Signal 322a. The reception of either the Qualified External Condition Signal 506 or the Internal Condition Signal 322a results in a Condition Detected Signal on Line 510. The Condition Detected Signal is provided to Select Circuit 512, which passes the signal to Line 514 if the Timer Mode State Device 516 is cleared, indicating that Timer Mode is disabled. Timer Mode will be discussed further below.

The signal on Line 514 is provided to multiple AND circuits, shown as AND circuits 516 and 518. Each of these AND circuits further receives a signal from the programmable Action Register 520, which may be programmed via Scan Interface 364 to selectively enable the signal from Line 514. The enabled signals are passed to various ones of the logic circuits shown as Logic A 308 and Logic N 310 of FIG. 3. More specifically, the Enable Halt A bit of Action Register 520 is set to allow AND circuit 516 to drive Halt A Signal on Line 344 to Logic A. Similarly, the Enable Halt N bit of Action Register is set to allow AND circuit 518 to driver Halt N Signal on Line 346 to Logic N. Although in this example, the signals provided to the various logic circuits are described as halt signals, these signals can be used to perform a variety of control functions as will be discussed below.

Control Unit 324 also provides a Timer Mode which is enabled by setting the Timer Mode State Device 516 via Scan Interface 364. When Timer Mode is selected, the Delayed Condition Signal on Line 522 is selected by Select Circuit 512. The Delayed Condition Signal is generated when the Condition Detected Signal on Line 510 enables Timer 524 which has been pre-initialized via Scan Interface 364 and Delay Timer Control Logic 526. Once enabled, Timer 524 decrements from the pre-initialized count to zero, at which time Delayed Condition Signal on Line 522 is provided to Select Circuit 512 and passed via Line 514 to AND Circuits 516 and 518. The various Halt Signals are thereafter generated for the logic circuits in the manner described above.

Timer Mode provides the capability to notify all logic in the system simultaneously of the occurrence of a condition, even if the maintenance system is configured in a daisy-chain or multiple-tiered configuration described in reference to FIG. 4 above. When one of these configurations is used, the time-delay associated with rippling a notification through the logic may result in the notification reaching some circuits a clock cycle or more after the first circuits receive the notification. If it is desirable that all units are notified at the same time, the notification to the first circuits may be delayed a predetermined number of clock cycles using programmable Timer Mode, thereby providing notification that occurs substantially simultaneously.

As discussed above, the notification provided by the halt signals shown as Halt A 344 and Halt N 346 may be utilized in various ways. If all bits in the Action Register 520 are set, a slam stop functionality is provided in which the state of the entire machine may be saved for analysis. Alternatively, only select circuits may receive the halt signals. For o example, halt signals may be selectively generated or cleared to disable/enable one or more selected history stacks which provide trace information on the logic areas under test. The assertion or de-activation of halt signals may further disable/enable counters circuits used for gathering performance data.

Control Unit 324 further provides additional functionality for clock control. Step Timer 528, which is loaded and controlled by Step Timer Control Logic 530, is used to provide step control. Using Scan Interface 364, Step Timer Control Logic 530 is programmed to receive an initial count value which is thereafter provided to Step Timer 528. Step Timer Control Logic 530 thereafter enables Step Timer 528, which is decremented to zero. After being loaded and prior to decrementing to zero, Step Timer generates high-active Step Signal 532 to AND circuits shown as AND Circuits 534 and 536 to selectively disable a respective halt signal for a predetermined period of time until the Step Timer decrements to zero, as determined by the initial count value. This allows the associated logic to receive clock signals only for the selected number of clock cycles determined by the initial count value, thereby providing a means to perform both single-stepping and multi-stepping clock functions. This functionality could also be used to selectively enable clock functions throughout the logic simultaneously so operations associated with advancing various clocks and timers within different units of the system are synchronized.

Finally, Control Unit 324 includes Input Enable Register 540, which is scan loadable via Scan Interface 364 to store enable information that controls the selective enabling of the one or more Condition Interfaces. Input Enable Register 540 is shown providing Input Enable 341. For a configuration having multiple Condition Interfaces, such as that shown in FIG. 4, Input Enable Register may store additional signals for providing additional enable signals such as Input Enable C 434 (FIG. 4.) Input Enable Register 540 can be used in conjunction with Enable External Condition State Device 502 to provide different levels of device enabling. For example, by enabling the Condition Interfaces using the Input Enable Register 540 while disabling reception of the External Condition using the Enable External Condition state device 502, event notification is allowed to propagate through a multi-port device without notifying the Control Unit within that device.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. For use in a digital logic device comprised of state devices clocked by a clock signal, the digital logic device being further comprised of combinational logic and interconnecting nets, wherein ones of the interconnecting nets are designated as condition indicators, each of the condition indicators indicative of a predetermined condition within said digital logic device, the digital logic device having interfaces, each of the interfaces to receive signals from, and provide signals to, an external logic device coupled to a respective one of the interfaces, a logic maintenance system, comprising:

a bi-directional port to receive an external condition signal from the external logic device, wherein said external condition signal is indicative of one or more predetermined conditions within the external logic device;

an internal condition detection circuit coupled to receive each of the condition indicators, said internal condition detection circuit to provide an internal condition indicator in response to the assertion of any of the condition indicators, said internal condition detection circuit further coupled to provide said internal condition indicator to said bi-directional port, and whereby said internal condition indicator may be provided to the external logic device;

an external condition detection circuit coupled to said bi-directional port to detect the assertion of said external condition signal and in response thereto, to generate an external condition indicator; and a control unit coupled to receive said internal condition indicator and to receive said external condition indicator, said control unit to generate an action signal in response to receiving either said external condition indicator or said internal condition indicator, said action signal being provided to predetermined ones of the state devices to perform a selected control function.

2. The logic maintenance system of claim 1, wherein said external condition detection circuit includes a synchronization circuit to synchronize said external condition indicator to the clock signal.

3. The logic maintenance system of claim 1, wherein said external condition detection circuit includes an anti-feedback circuit.

4. The logic maintenance system of claim 1, wherein said control unit is capable of selectively generating multiple action signals whereby each of said multiple action signals is provided to predetermined ones of the state devices to perform a selected control function, and whereby said control unit further includes a programmable storage device to be programmed to determine which of said multiple action signals are generated in response to receiving said external condition indicator or said internal condition indicator.

5. The logic maintenance system of claim 1, wherein said control unit includes a programmable storage device to be programmed to selectively enable generation of said external condition indicator.

6. The logic maintenance system of claim 1, wherein said control unit includes a programmable storage device to be programmed to enable monitoring of only selected ones of the condition indicators.

7. The logic maintenance system of claim 1, wherein said action signal is generated within the same cycle of the clock as is said internal condition indicator or said external condition signal, and wherein the logic maintenance system further includes circuits to allow said action signal to preserve the state of said predetermined ones of the state devices at the time said internal condition indicator or said external condition signal is generated.

8. The logic maintenance system of claim 1, wherein said logic maintenance system includes a central control unit coupled to receive said internal condition indicator, said central control unit to clear an asserted one of said predetermined ones of said state devices following assertion of said internal condition indicator or said external condition indicator.

9. The logic maintenance system of claim 1, and further including a clock control circuit coupled to said control unit to receive said action signal, said clock control circuit to control reception of the clock signal by said predetermined ones of the state devices according to said action signal.

10. For use in a logic design having logic circuits partitioned into multiple groups, each group including condition indicators each indicative of a condition existing within one of the logic circuits included within the respective group, a maintenance system, comprising:

a plurality of internal condition detectors, each of said internal condition detectors included within a different respective one of the multiple groups and coupled to receive as respective condition indicators the condition indicators included within said different respective one of the multiple groups, each of said internal condition detectors to generate a respective internal condition indicator if any of said respective condition indicators are asserted;

a plurality of bi-directional ports, each of said bi-directional ports included within a different respective one of the multiple groups, each of said bi-directional ports coupled to all other ones of said bi-directional ports, each of said bi-directional ports coupled to receive said respective internal condition indicator and to provide said respective internal condition indicator to said all other ones of said bi-directional ports, each of said bi-directional ports coupled to receive as a respective external condition indicator all internal condition indicators from said all other ones of said bi-directional ports; and a plurality of control units, each of said control units included within a different respective one of the multiple groups, each of said control units coupled to receive said respective external condition indicator and said respective internal condition indicator, and in response to the assertion of either said respective external condition indicator or said respective internal condition indicator, to generate a respective action signal which is provided to ones of the logic circuits within said different respective one of the multiple groups, and whereby the assertion of any of the condition indicators in any of the multiple groups is capable of initiating the transmission of each said respective action signal within each of the multiple groups substantially simultaneously.

11. The maintenance system of claim 10, and further including a plurality of clock control circuits, each of said clock control circuits coupled to a different respective one of said control units and coupled to one or more associated ones of the logic circuits within said different respective one of the multiple groups, each of said clock control circuits to receive said respective action signal from said different respective one of said control units and to thereafter prevent the current state of said one or more associated ones of the logic circuits from changing.

12. The maintenance system of claim 10, wherein each of said control units includes a respective programmable storage device to store programmable condition enable indicators, each of said condition enable indicators being provided to selectively enable reception of said respective condition indicators by said respective one of said internal condition detectors.

13. The maintenance system of claim 10, wherein each of said control units includes a respective programmable storage device to store an external programmable condition enable indicator to selectively block the detection of said respective external condition indicator.

14. The maintenance system of claim 10, wherein each said control unit includes circuits to generate multiple respective action signals, each of said multiple respective action signals to initiate a selected action within respectively different ones of the logical circuits within said different respective one of said multiple groups substantially simultaneously.

15. The maintenance system of claim 14, wherein each said control unit includes a respective programmable storage device to store programmable action enable indicators, wherein each of said programmable action enable indicators selectively enables the generation of a different one of said multiple respective action signals.

16. The maintenance system of claim 10, and further including a central control unit coupled to receive at least one said respective internal condition indicator and at least one said respective external condition indicator, said central control unit to read the condition indicators in selectable ones of the logic groups following reception of said at least one said respective internal condition indicator or said at least one said respective external condition indicator.

17. The maintenance system of claim 10, wherein the logic design is implemented using multiple physical devices, wherein each of the logic groups is implemented within a different respective one of said multiple physical devices, and wherein each of said bi-directional ports is a pin included within a different respective one of said multiple physical devices.

18. For use in a logic design having logic circuits partitioned into multiple groups, each group including condition indicators each indicative of a condition existing within one of the logic circuits included within the respective group, a maintenance system, comprising:

a plurality of internal condition detectors, each of said internal condition detectors included within a respective one of the multiple groups and coupled to receive as respective condition indicators the condition indicators included within said respective one of the multiple groups, each of said internal condition detectors to generate a respective internal condition indicator if any of said respective condition indicators are asserted;

a plurality of bi-directional ports, each of said bi-directional ports included within a respective one of the multiple groups, each of said bi-directional ports coupled to a different respective one of said plurality of internal condition detectors to receive said respective internal condition indicator, said plurality of bi-directional ports including first bi-directional ports and second bi-directional ports, and wherein:

each of said first bi-directional ports are coupled to all other ones of said first bi-directional ports to provide said respective internal condition indicator to said all other ones of said first bi-directional ports, each of said first bi-directional ports to receive as a respective external condition indicator all of said internal condition indicators from said all other ones of said first bi-directional ports;

each of said second said bi-directional ports are coupled to all other ones of said second bi-directional ports to provide said respective internal condition indicator to said all other ones of said second bi-directional ports, each of said second bi-directional ports to receive as a respective external condition indicator all of said internal condition indicators from said all other ones of said second bi-directional ports; and wherein one of said first ones of said bi-directional ports is coupled to provide said respective external condition indicator to a respective internal condition detector coupled to one of said second ones of said bi-directional ports, and wherein said one of said second ones of said bi-directional ports is coupled to provide said respective external condition indicator to a respective internal condition detector coupled to said one of said first ones of said bi-directional ports; and a plurality of control units, each of said control units coupled to a respective different one of said plurality of internal condition detectors to receive said respective internal condition indicator, and in response thereto, to generate a respective action signal which is provided to ones of the logic circuits within said at least one of the multiple groups, and whereby the assertion of any of the condition indicators in any of the multiple groups is capable of initiating the transmission of each said respective action signal within each of the multiple groups.

19. The maintenance system of claim 18, wherein ones of said control units each include a programmable timer circuit, each said programmable timer circuit coupled to control the time at which said respective action signal is generated, and whereby each said respective action signal is generated within said respective different one of the multiple groups substantially simultaneously.

20. The maintenance system of claim 18, and further including a plurality of clock control circuits, each clock control circuit coupled to an associated control unit and coupled to one or more associated ones of the logic circuits, said each clock control circuit to receive said respective action signal and in response thereto, to prevent the current state of said one or more associated ones of the logic circuits from changing.

21. The maintenance system of claim 18, wherein each of said control units includes a programmable storage device to store programmable condition enable indicators, each of said condition enable indicators to selectively enable reception of ones of said respective condition indicators by said one or more respectively different ones of said plurality of internal condition detectors.

22. The maintenance system of claim 18, wherein each of said control units includes a respective programmable storage device which may be programmed to block one or more ones of said plurality of bi-directional ports each from receiving said respective external condition indicator.

23. The maintenance system of claim 18, wherein each said control unit includes circuits to generate multiple respective action signals, each of said multiple respective action signals to initiate a selected action within respectively different ones of the logical circuits substantially simultaneously.

24. The maintenance system of claim 23, wherein each said control unit includes a respective programmable storage device to store programmable action enable indicators, wherein each of said programmable action enable indicators selectively enables the generation of a different one of said multiple respective action signals.

25. The maintenance system of claim 18, and further including a central control unit coupled to receive at least one said respective internal condition indicator and at least one said respective external condition indicator, said central control unit to read the condition indicators in selectable ones of the logic groups following reception of said at least one said respective internal condition indicator or said at least one said respective external condition indicator.

26. For use in a logic design including predetermined nets designated as condition indicators, each of said condition indicators indicative of a logic state within a respective logic circuit, the logic design further being segmented into logic groups wherein each logic group includes ones of the logic circuits and ones of the condition indicators, a maintenance system and interface for monitoring the state of the condition indicators, comprising:

internal condition detector means coupled to each of the condition indicators for detecting the assertion of any of the condition indicators and for generating multiple internal condition indicators in response thereto, wherein each of said multiple internal condition indicators is associated with, and generated in response to, the condition indicators included within a respectively different one of the logic groups;

a plurality of bi-directional port means coupled to said internal condition detector means, each for receiving a respectively different one of said multiple internal condition indicators from said internal condition detector means and each for providing said respectively different one of said multiple internal condition indicators to other predetermined ones of said bi-directional port means, each of said plurality of bi-directional port means for receiving as an external condition indicator ones of said multiple internal condition indicators provided by other ones of said plurality of bi-directional port means; and control means coupled to each of said bi-directional port means for receiving ones of said external condition indicators and coupled to said internal detector means for receiving ones of said internal condition indicators, said control means for providing action signals to predetermined ones of the circuits in response to receiving said ones of said external condition indicators or said ones of said internal condition indicators, wherein said action signals initiate substantially simultaneously one or more predetermined functions within said predetermined ones of the circuits.

27. The maintenance system and interface of claim 26, wherein the logic design in implemented using a plurality of physical devices, each of the logic groups is implemented in a different respective one of said plurality of physical devices, wherein each of said plurality of bi-directional port means is included within a different respective one of said plurality of physical devices, and further including external interface means coupled to each of plurality said bi-directional port means for transferring said respectively different one of said multiple internal condition indicators to other predetermined ones of said bi-directional port means.

28. The maintenance system and interface of claim 26, and including means for providing ones of said external condition indicators to said internal condition detection means for causing said internal condition detector means to generate a predetermined one of said multiple internal condition indicators.

29. The maintenance system and interface of claim 26, wherein the logic design includes a clock signal provided to said predetermined ones of the circuits, and further including clock control means coupled to said control means for receiving said action signals, and in response thereto, for asserting control over the reception of the clock signal within said predetermined ones of the circuits, said control being asserted substantially simultaneously within said predetermined ones of the circuits.

30. The maintenance system and interface of claim 26, wherein said control means includes programmable storage means for storing programmable condition enable indicators, each of said condition enable indicators for allowing detection by said internal detector means of a respectively different one of said multiple internal condition indicators.

31. The maintenance system and interface of claim 26, wherein said control means includes programmable storage means for storing programmable action enable indicators, each for enabling the generation a respectively different one of said action signals.

* * * * *